Dec. 3, 1929.  J. F. WHEELER  1,738,218
BULB DROPPER
Filed March 11, 1926  2 Sheets-Sheet 1

INVENTOR.
James F. Wheeler,
BY
Hood & Hahn.
ATTORNEYS

Dec. 3, 1929.  J. F. WHEELER  1,738,218
BULB DROPPER
Filed March 11, 1926  2 Sheets-Sheet 2
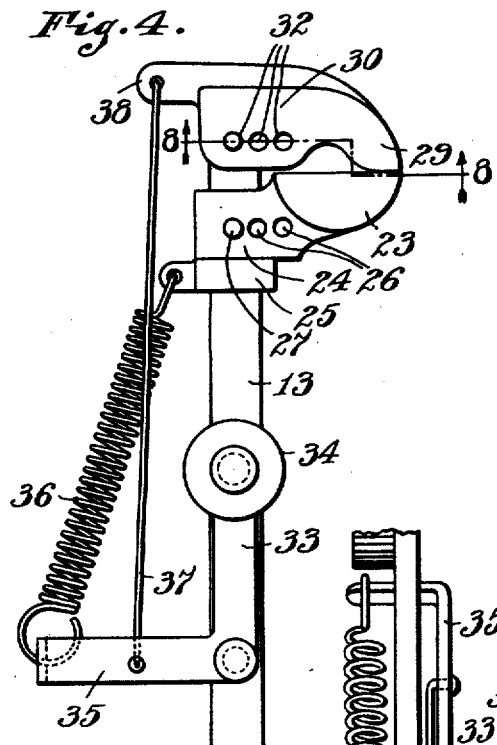
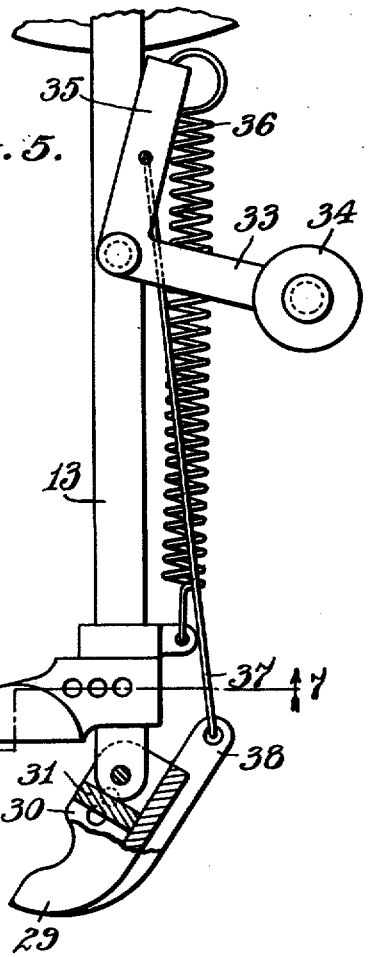
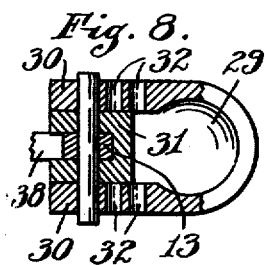
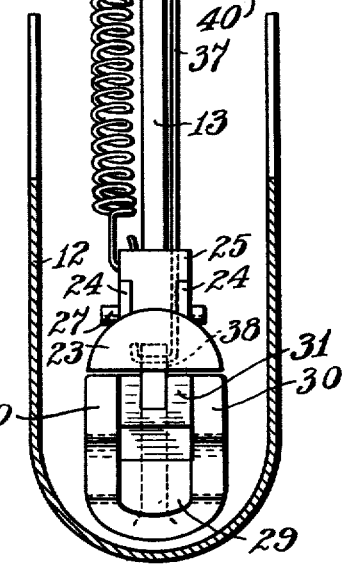
INVENTOR.
James F. Wheeler,
BY
Hood + Hahn
ATTORNEYS Patented Dec. 3, 1929

1,738,218

UNITED STATES PATENT OFFICE

JAMES F. WHEELER, OF INDIANAPOLIS, INDIANA

BULB DROPPER

Application filed March 11, 1926. Serial No. 93,890.

My invention relates to improvements in machines for setting out bulbs and large seeds having particular reference to the planting of onion "sets" and the like. My invention is designed more particularly for planting onion sets although it is adaptable for use in planting various other "sets".

One of the objects of my invention is to provide in a machine of this character automatic means for picking up the "sets" from a suitable receptacle and depositing the same in the furrow or trough in the ground.

For the purpose of disclosing my invention I have illustrated one embodiment thereof in the accompanying drawings in which Fig. 1 is a side elevation partly in section of a machine embodying my invention;

Fig. 4 is a side elevation of a "set" depositing finger;

Fig. 5 is a similar view of the same in another position, partly in section;

Fig. 6 is a detail sectional view taken transversely through the feeder trough;

Fig. 7 is a sectional view taken on the line 7—7 of Fig. 5, and

Fig. 8 is a detail section taken on the line 8—8 of Fig. 4.

Figure 1:
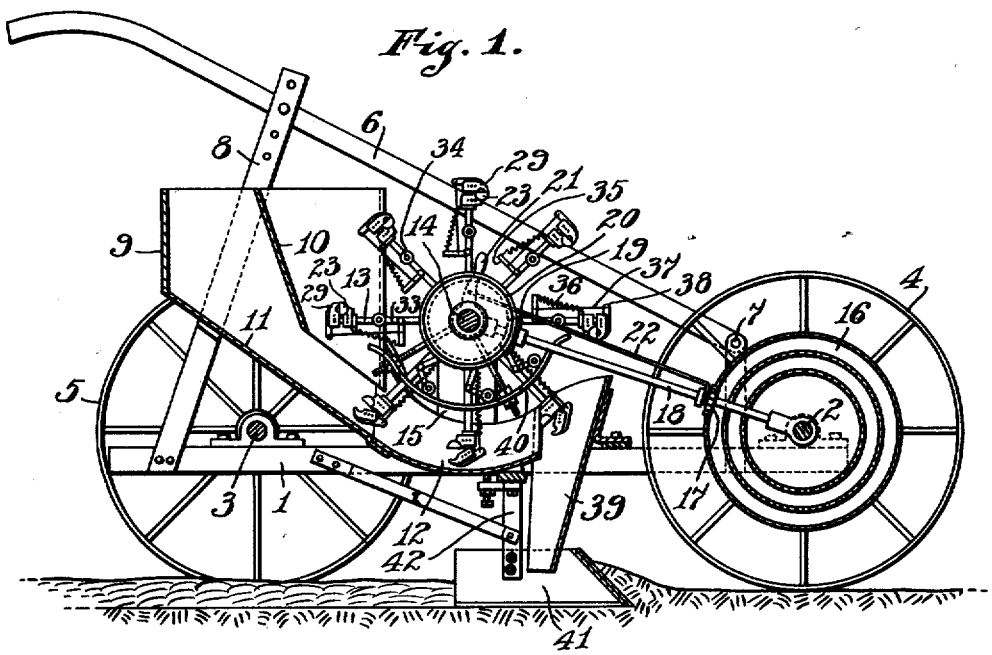
Figure 2:
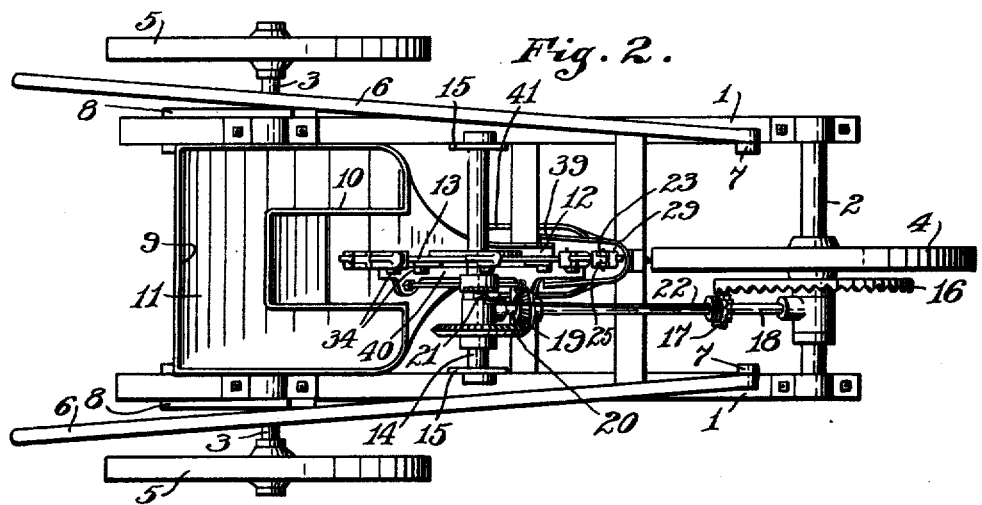
Fig. 2 is a plan view.
Figure 3:
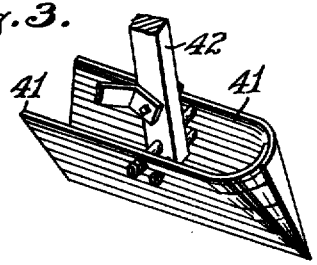
Fig. 3 is a perspective view of the plow.

In the embodiment of the invention illustrated I provide a suitable frame comprising the two side bars 1 between which extend the forward shaft 2 and the rear shaft 3. A supporting and driving wheel 4 is mounted on the shaft 2 between the two side bars 1 and suitable follower supporting wheels 5 are mounted on the rear shaft 3 outside of the side bars. Guiding handles 6 extend rearwardly from the frame being connected to the forward end of the frame at 7 and braced at the rear end of the frame by vertically extending braces 8.

The frame carries at its rear end a hopper 9 having at its forward end a U shaped dividing wall 10 open at its bottom. The hopper 9 is provided with a sloping bottom 11 which terminates and delivers into a delivery trough 12 substantially U shaped in cross section.

For removing the "sets" from the trough 12 and delivering them into the furrow I provide a series of radially disposed picker arms 13 which are mounted on a shaft 14 in turn mounted upon vertical uprights 15 on the frame. This shaft is driven from the front drive wheel 4 and to this end the shaft 2 which rotates with the wheel 4 is provided with a series of concentrically arranged gears 16 of various diameters and having side gear teeth. The gear teeth are adapted to mesh with a pinion 17 splined on a shaft 18 one end of which is provided with a bevel pinion 19 adapted to mesh with and drive a bevel gear 20 on the shaft 14. The pinion 17 is adjusted along the shaft 18 to mesh with any one of a series of gears 16 by a suitable adjusting lever 21 connected by a link rod 22 with the pinion 17. The speed at which the shaft 14 is driven is varied by meshing the pinion 17 with the different drive gears 16 and by varying the speed of the shaft and feed of the machine is correspondingly varied.

Each of the arms 13 is provided with a pair of cup-like fingers at its outer end, the inner cup finger 23 is normally stationarily mounted on the arm, being however adjustable to accommodate different sized "sets". To this end the cup portion of the finger is provided with a pair of spaced apart arms or lugs 24 embracing a filler block 25 mounted on the arm 13 and the lugs are provided with a series of openings 26 to receive a securing pin 27 passing through the lugs, the filler block 25 and the arm 13. For adjusting for different sized sets the cup or finger is moved transversely of the arm 13 and transversely of the filler block 25, this filler block is provided to form a rear wall 28 for the inner portion of the finger.

A second cup finger 29 is mounted on the arm 13 to co-operate with the finger 23 and this cup finger 29 is pivoted on the arm so as to move away from and toward the finger 23. This cup finger is likewise provided with a pair of spaced apart lugs or arms 30 embracing the end of the arm 13 and a U-shaped filler block 31. The arms 30 are provided with a series of pin receiving openings 32 to receive a holding and pivot pin and for adjusting the finger for different sized "sets" the pin is placed in different openings in the arms, the filler block 31 remaining stationary on the arm 13. The outer finger 29 is opened and closed by means of a bell crank lever one arm 33 of which is provided with a roller 34, the opposite arm 35 being connected by a coiled spring 36 with the arm 13 and by a link rod 37 with an arm 38 on the finger, this connection being such that the coiled spring tends to hold the movable finger 29 in closed relation with respect to the finger 23. As the arms 13 rotate the fingers respectively pass through the trough 12, being opened during their passage and receive a "set". As they pass out of the trough the fingers are adapted to close upon the "set" and hold the same until they reach the vertically extending delivery chute 39 when they are opened to permit the "set" to drop through the chute. For accomplishing this result I provide a cam 40 adapted as the ends of the arms move into the chute 39 and toward the trough 12 to engage the rollers 34 to cause the fingers of each arm to open. As each arm and its fingers pass out of the trough and upwardly the roller passes off of the cam 40 permitting the fingers to close upon the "set".

The chute 39 delivers between the blades 41 of a plow mounted on a support 42 extending downwardly from the frame and adapted as the apparatus progresses to open a furrow for receiving the "sets" as they are dropped from the chute 39.

The term "bulb" used in the claims is intended to designate any article from which a plant is to grow and of such character, as to size and conformation that it may be handled by mechanism of the character described. Primarily the machine was designed for planting onion sets but it will be readily apparent that the usefulness of the machine is by no means restricted to that type of seed.

I claim as my invention:

1. A machine for setting bulbs including a trough into which the bulbs are delivered, a plurality of rotating radial arms each having a pair of gripping fingers transversely adjustable on their arms to accommodate different sized bulbs and adapted to pass through said trough during their rotation, and means for opening said fingers during the passage thereof through the trough and closing them as they emerge from said trough.

2. A machine for setting bulbs including a trough into which the bulbs are delivered, a plurality of rotating arms each having a pair of gripping fingers, the fingers of each pair being cup shaped and having rearwardly extending ears adjustably embracing the arm, said fingers being adapted to pass through the trough as the arms are rotating and means for opening said fingers prior to their entry to the trough and for closing said fingers as they emerge from said trough.

3. A machine for setting bulbs, including a trough adapted to receive the bulbs, a plurality of rotating arms, each having a pair of gripping fingers, each of which comprises a cup shaped bulb receiver, a pair of rearwardly extending ears and a filler block adjustably mounted between said ears and adapted to embrace the arm, and means for opening said fingers as they arrive adjacent said trough, maintaining them open during their passage through the trough and closing them as they emerge from the trough.

In witness whereof, I, JAMES F. WHEELER have hereunto set my hand at Indianapolis, Indiana, this 8th day of March, A. D. one thousand nine hundred and twenty six.

JAMES F. WHEELER.